US005408733A

United States Patent [19]

Blankenship

[11] Patent Number: 5,408,733

[45] Date of Patent: Apr. 25, 1995

[54] CYLINDER SLEEVE PULLER

[76] Inventor: Jim D. Blankenship, 3001 S. State St. #28, Ukiah, Calif. 95482-6948

[21] Appl. No.: 143,652

[22] Filed: Nov. 1, 1993

[51] Int. Cl.[6] .......... B23P 19/04
[52] U.S. Cl. .......... 29/262; 29/266
[58] Field of Search .......... 81/2; 29/259–263, 29/266

[56] References Cited

U.S. PATENT DOCUMENTS

| | | | |
|---|---|---|---|
| 1,953,849 | 4/1934 | Damm | 29/262 |
| 2,421,324 | 5/1947 | Graham | 29/262 |
| 3,258,998 | 7/1966 | Harper | 81/2 |
| 4,021,904 | 5/1977 | Constant | 29/263 |
| 4,864,709 | 9/1989 | Klucz et al. | 29/259 |
| 4,908,925 | 3/1990 | Johnson | 29/260 |

FOREIGN PATENT DOCUMENTS

| | | | |
|---|---|---|---|
| 494711 | 10/1938 | United Kingdom | 29/266 |

*Primary Examiner*—Robert C. Watson

[57] ABSTRACT

A cylinder sleeve puller for use in combination with a cylinder positioned in an engine block and having a removable sleeve liner therein comprising a rigid support frame having a horizontal member supported by a pair of depending vertical ends, said vertical ends being adapted to be disposed on each side of the cylinder to be worked upon in engagement with the surface of the engine block adjacent such cylinder; a threaded rod extending through the center of said horizontal member and adapted to be threaded up and down therethrough within said cylinder and its associated removable sleeve liner; a horizontally extendible lifting member pivotally connected to the base of said threaded rod and adapted to pivot to a downward angle to permit insertion into said cylinder; and sleeve-engaging lift surfaces at each end of said lifting member to engage with the base of said sleeve and to exert upward extracting forces thereon when said lifting plate is pulled upward by action of the attached threaded rod. This construction allows automatic centering of the lifting force. Modifications include an oiler for providing lubricating oil to the threaded rod and its associated bearings.

1 Claim, 3 Drawing Sheets

CYLINDER SLEEVE PULLER

BACKGROUND OF THE INVENTION

1. Field of the Invention

The present invention relates to cylinder liner sleeve pullers and more particularly pertains to such a puller which is self-aligning and simple in operation.

2. Description of the Prior Art

The use of cylinder liner sleeve pullers is known in the prior art. More specifically, these devices heretofore devised and utilized for the purpose of extracting sleeves from engine cylinders are known to consist basically of familiar, expected and obvious structural configurations, notwithstanding the myriad of designs encompassed by the crowded prior art which have been developed for the fulfillment of countless objectives and requirements. Representative sleeve pulling devices are illustrated in U.S. Letters Pat. Nos. 4,057,889; 3,972,104; 4,707,900; 3,808,666; and 5,033,177.

In this respect, the sleeve puller according to the present invention substantially departs from the conventional concepts and designs of the prior art, and in so doing provides an apparatus primarily developed for the purpose of easily aligning with and extracting a sleeve liner.

SUMMARY OF THE INVENTION

In view of the foregoing disadvantages inherent in the known types of cylinder sleeve pullers now present in the prior art, the present invention provides an improved sleeve puller construction wherein the same can be utilized to easily and effectively line up and extract a cylinder sleeve from an engine block. As such, the general purpose of the present invention, which will be described subsequently in greater detail, is to provide a new and improved sleeve pulling apparatus and method which has all the advantages of the prior art devices and none of the disadvantages.

To attain this, the present invention essentially relates to a cylinder sleeve puller for use in combination with a cylinder positioned in an engine block and having a removable sleeve liner therein comprising a rigid support frame having a horizontal member terminating in a pair of depending vertical ends, said vertical ends being adapted to be disposed on each side of the cylinder to be worked upon and with the lower surfaces thereof in engagement with the surface of the engine block adjacent such cylinder; a threaded rod extending through the center of said horizontal member and adapted to be threaded up and down therethrough within said cylinder and its associated removable sleeve liner; a horizontally extendible lifting member pivotally connected to the base of said threaded rod and adapted to pivot to a downward angle to permit insertion into said cylinder; and sleeve-engaging lift surfaces at each end of said lifting member to engage with the base of said sleeve and to exert upward extracting forces thereon when said lifting plate is pulled upward by action of the attached threaded rod. This construction allows automatic centering of the lifting force.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved cylinder sleeve puller which has all the advantages of the prior art devices and none of the disadvantages.

It is another object of the present invention to provide a new and improved cylinder sleeve puller which may be easily and efficiently manufactured and marketed.

It is a further object of the present invention to provide a new and improved cylinder sleeve puller which is of a durable and reliable construction.

An even further object of the present invention is to provide a new and improved cylinder sleeve puller which is susceptible of a low cost of manufacture with regard to both materials and labor, and which accordingly is then susceptible of low prices of sale to the consuming public, thereby making such devices economically available to the buying public.

Still yet another object of the present invention is to provide a new and improved cylinder sleeve puller which provides in the apparatuses and methods of the prior art some of the advantages thereof, while simultaneously overcoming some of the disadvantages normally associated therewith.

Still another object of the present invention is to provide a new and improved self-aligning sleeve puller.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
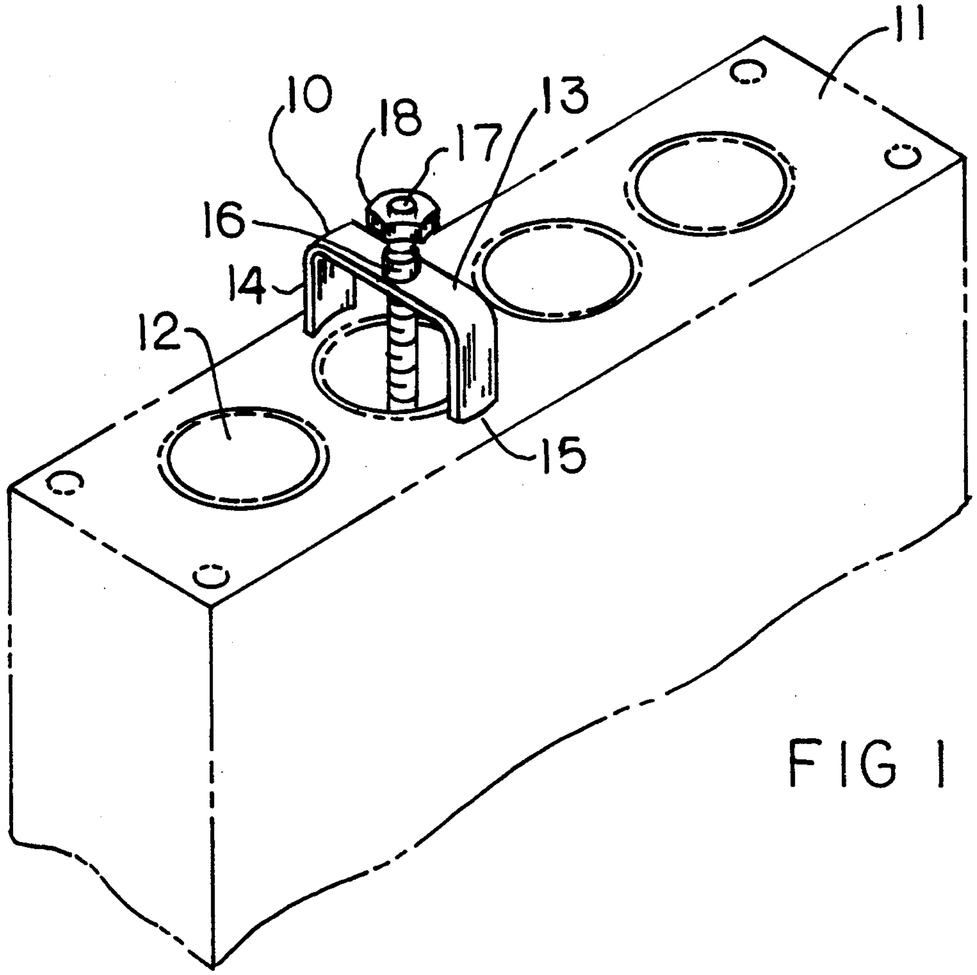
FIG. 1 is a perspective view of an engine block with the sleeve puller device of the present invention positioned in a cylinder thereof.

With reference now to the drawings, and in particular to FIG. 1 thereof, a new and improved cylinder sleeve puller embodying the principles and concepts of the present invention and generally designated by the reference numeral 10 will be described.

More specifically, it will be noted that the cylinder sleeve puller 10 is positioned atop the cylinder block 11 (shown in broken lines) astride the cylinder 12. As more clearly shown in succeeding Figures, the puller 10 has a support frame formed of a horizontal plate member 13 having a pair of depending vertical ends 14. Preferably members 13 and 14 are formed from a single piece of steel bent into a "U" configuration although they may be separate members welded or otherwise rigidly fastened together. The spacing between leg member 14 may vary depending upon the diameter of the cylinder to be worked on, but must be such as to permit the curved base 15 of members 14 to contact the cylinder block 11 or either side of cylinder 12. Centrally positioned in the horizontal member 13 is threaded block and aperture 16 through which passes a threaded rod 17. Mounted on such rod 17 above member 13 is a nut 18 affixed to the upper end of rod 17. Rod 17 will move up or down through block 16 when turning torque is applied to nut 18 affixed to the end of such rod 17.

Figure 2:
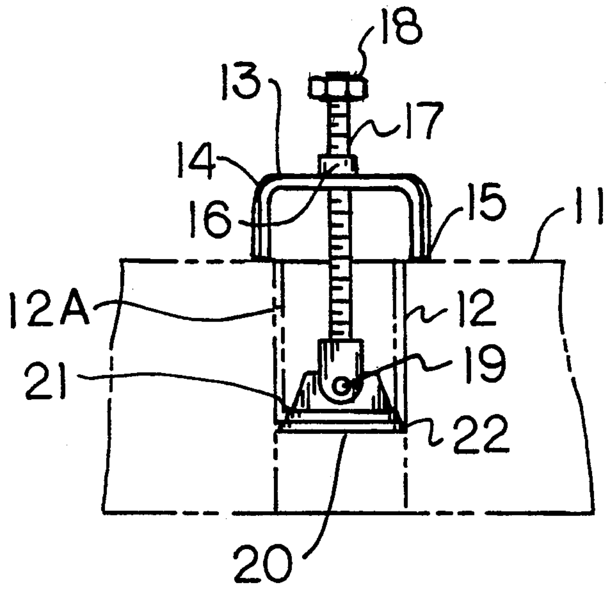
FIG. 2 is a sectional side plan view of the present invention positioned within a cylinder.

As shown in FIG. 2, the rod 17 extends down into cylinder 12 and has, pivotally affixed to its lower end as at 19, a puller plate 20. Such plate 20 has a stepped flat upper surface 21 forming a cylinder sleeve 12-A (shown in broken lines in FIG. 2) engaging member 22 at each end thereof. When being inserted into the cylinder 12, plate 20 will pivot to provide clearance therethrough and once below the sleeve 12-A and upon upward retraction by the action of nut 18 on threaded rod 17 in block 16 will swing into horizontal position as shown in FIG. 2. The sleeve engaging members 22 then contact the base of cylinder sleeve 12-A and continual upward movement of rod 17 will cause such sleeve to be withdrawn from cylinder 12.

Figure 3:
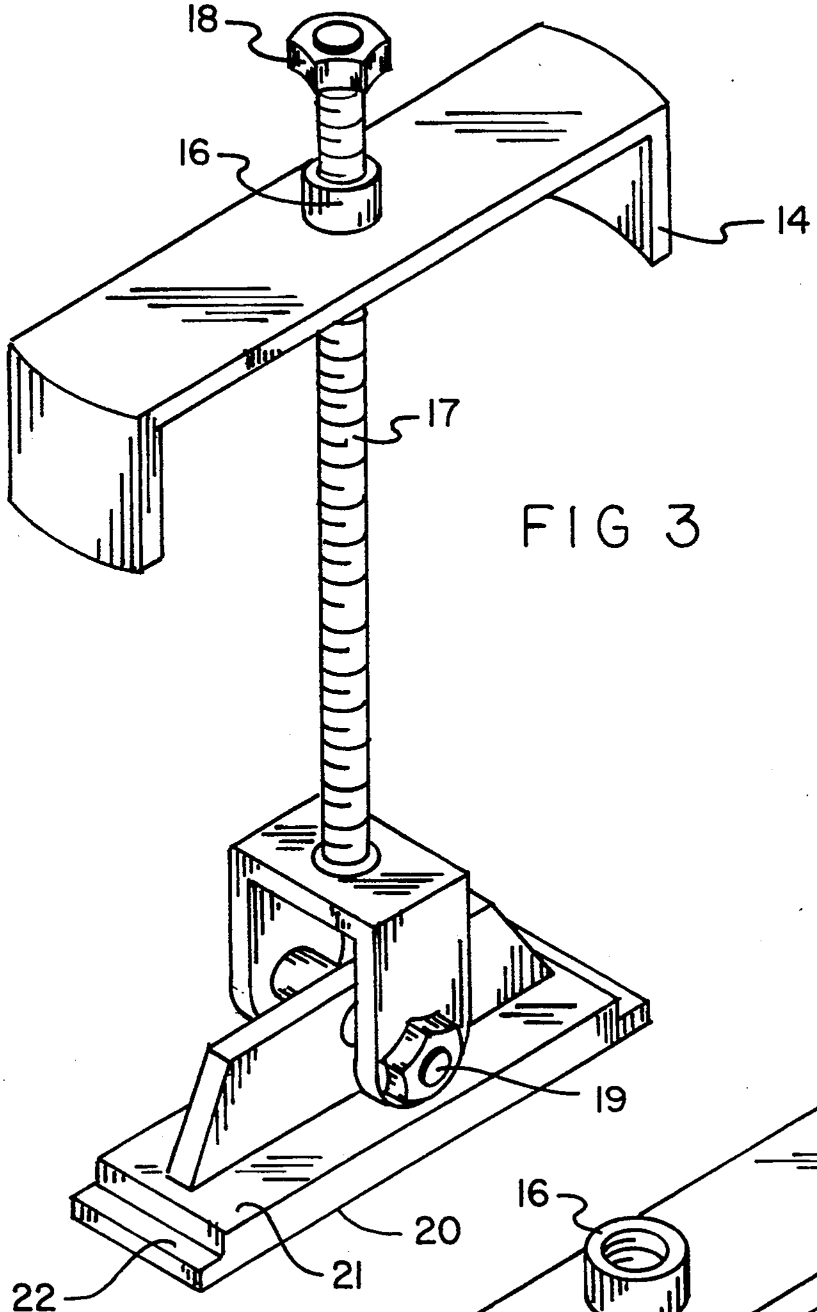
FIG. 3 is a perspective view of the device of the present invention.

FIG. 3 illustrates the puller 10 by itself, clearly showing the puller plate 20, its pivoting attachment 19 to rod 17, the cylinder sleeve engaging members 22 at each end of plate 20, and the horizontal member 13 with depending vertical ends 14.

Figure 4:
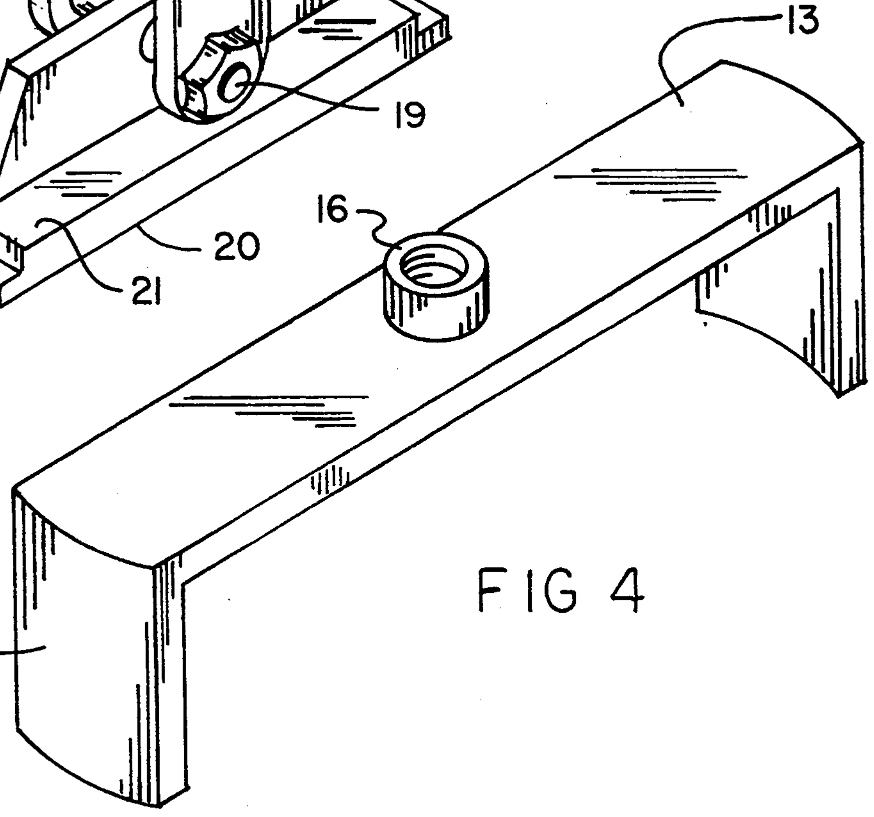
FIG. 4 is a perspective view of the support frame of the device of FIG. 3.

FIG. 4 illustrates the rigid support frame having a horizontal plate 13 with vertically depending ends 14 thereon. Also shown is the threaded block and aperture 16 through which the rod 17 passes in use.

Figure 5:
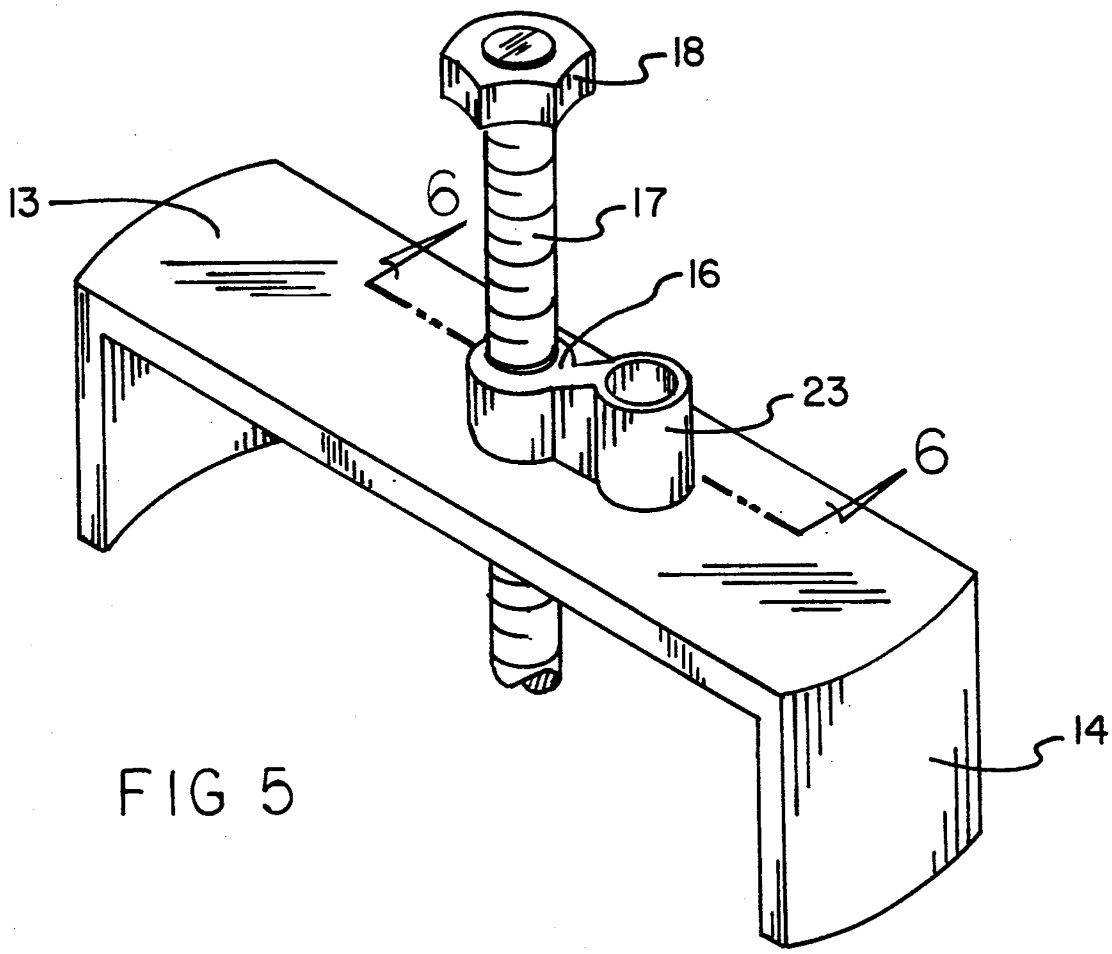
FIG. 5 is a perspective view of a modification of the device of FIG. 4.
Figure 6:
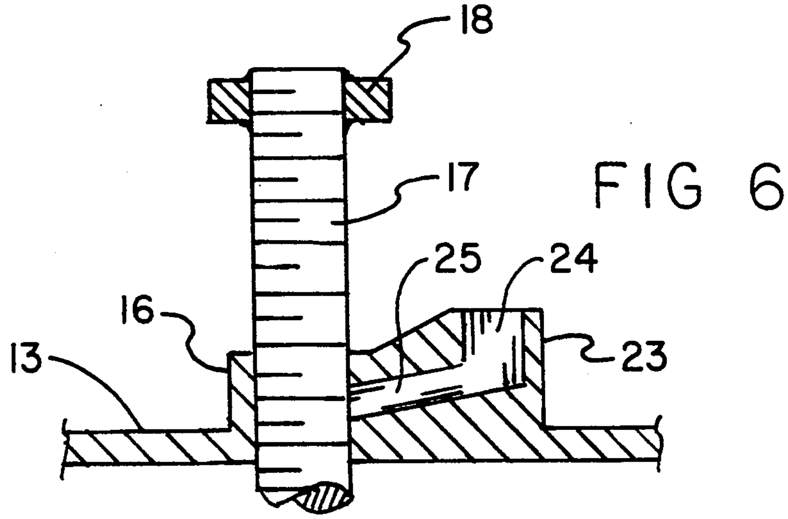
FIG. 6 is a sectional view on line 6—6 of FIG. 5.

FIG. 5 illustrates the addition to block 16 of an oiler 23 which, as shown in the sectional view of FIG. 6, has a reservoir portion 24 into which oil may be poured and from which dispensing channel 25 leads the oil to the threads of block 16 and rod 17. Oil on the threads of rod 17 will also be carried down to the pivot unit 19 as shown in the preceding drawings.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A cylinder sleeve puller device for use in combination with a cylinder positioned in an engine block and having a removable sleeve liner therein which comprises: a rigid support frame having an upper horizontal member terminating in a pair of depending vertical ends, said vertical ends being adapted to be disposed on each side of the cylinder to be worker upon and with the lower surface of each depending vertical end being in engagement with the surface of the engine block adjacent such cylinder, said vertical ends being substantially arcuately shaped so as to define a curved base at a lower distal end of each of said vertical ends such that said curved base substantially follows a contour of said cylinder to permit placement of said vertical ends immediately adjacent to said cylinder; a threaded rod extending through the center of said horizontal member and adapted to be threaded up and down through a threaded block affixed to said upper horizontal member into such cylinder and its associated sleeve liner; a horizontally extensible lifting member pivotally connected to the base of said threaded rod, said lifting member being pivotable to a downwardly angular position for insertion into such lined cylinder and swingable to the horizontal position when such lifting member is once below the liner in such cylinder; and sleeve engaging lift surfaces at each end of said lifting member to engage with the base of such sleeve and to exert upward extracting forces thereon when said lifting plate is pulled upward by action of the attached threaded rod; and further comprising means to dispense lubricating oil to the threaded block and to the threaded rod passing therethrough, said means to dispense lubricating oil comprising a reservoir integrally formed adjacent to said threaded block, said reservoir comprising a substantially cylindrical member having an open top for containing said lubricating oil within an interior of said cylindrical member; and a dispensing channel extending between said reservoir and said threaded block to provide fluid communication between said interior of said reservoir and threads of said threaded block, said dispensing channel being downwardly sloped such that said lubricating oil will flow from said reservoir to said threads of said threaded block during use of said cylinder sleeve puller device, wherein said open top of said reservoir permits an individual utilizing said cylinder sleeve puller device to visually ascertain a level of said lubricating oil within said reservoir.

* * * * *